(12) United States Patent
Mehl et al.

(10) Patent No.: US 9,732,943 B2
(45) Date of Patent: Aug. 15, 2017

(54) LIGHTING APPARATUS WITH LUMINOPHORE ON A MOVEABLE CARRIER

(71) Applicant: OSRAM GMBH, Munich (DE)

(72) Inventors: Oliver Mehl, Berlin (DE); Holger Laabs, Berlin (DE); Josef Kroell, Potsdam (DE)

(73) Assignee: OSRAM GmbH, Munich (DE)

( * ) Notice: Subject to any disclaimer, the term of this patent is extended or adjusted under 35 U.S.C. 154(b) by 612 days.

(21) Appl. No.: 14/360,913

(22) PCT Filed: Sep. 20, 2012

(86) PCT No.: PCT/EP2012/068552
§ 371 (c)(1),
(2) Date: May 27, 2014

(87) PCT Pub. No.: WO2013/075859
PCT Pub. Date: May 30, 2013

(65) Prior Publication Data
US 2014/0328044 A1  Nov. 6, 2014

(30) Foreign Application Priority Data

Nov. 25, 2011  (DE) .......................... 10 2011 087 112

(51) Int. Cl.
*F21V 9/00* (2015.01)
*F21V 14/08* (2006.01)
(Continued)

(52) U.S. Cl.
CPC ................ *F21V 14/08* (2013.01); *F21V 9/14* (2013.01); *G03B 21/204* (2013.01); *G03B 33/08* (2013.01);
(Continued)

(58) Field of Classification Search
CPC ................................... F21V 14/08; F21V 9/16
See application file for complete search history.

(56) References Cited

U.S. PATENT DOCUMENTS

2007/0019408 A1  1/2007 McGuire et al.
2008/0231162 A1* 9/2008 Kurihara ............... F21V 9/10
                                                     313/487
(Continued)

FOREIGN PATENT DOCUMENTS

CN      101539270    9/2009
DE   10 2010 001 945  8/2011
JP       2010-529610   8/2010

*Primary Examiner* — Evan Dzierzynski
(74) *Attorney, Agent, or Firm* — Cozen O'Connor

(57) ABSTRACT

The lighting device (11) has at least one light generation device (12) for generating a primary light (P), a first luminophore (16) for converting the wavelength of the primary light (P) to a first secondary light (S1), and a second luminophore (20) for converting the wavelength of the primary light (P) to a second secondary light (S2), the first luminophore (16) being located on a movable support (15), which is provided in order to alternatively move the first luminophore into and out of a beam path of the primary light (P), and the second luminophore being located on a stationary support (21). The invention also relates to a method for generating wavelength-converted secondary light from primary light with alternating irradiation of a first luminophore located on a movable support and of a second luminophore located on a stationary support by the primary light. The invention can be used, for example, as a projection device for film and video projection, in endoscopy, for lighting effects in the entertainment industry, for medical irradiations as well as in the automobile industry, in particular as a head light for motor vehicles.

11 Claims, 5 Drawing Sheets

(51) Int. Cl.
*G03B 21/20* (2006.01)
*G03B 33/08* (2006.01)
*H04N 9/31* (2006.01)
*F21V 9/14* (2006.01)
*G02B 26/00* (2006.01)
*F21V 7/22* (2006.01)
*F21V 9/16* (2006.01)

(52) U.S. Cl.
CPC .......... *H04N 9/3158* (2013.01); *H04N 9/3161* (2013.01); *H04N 9/3167* (2013.01); *F21V 7/22* (2013.01); *F21V 9/16* (2013.01); *G02B 26/008* (2013.01)

(56) References Cited

U.S. PATENT DOCUMENTS

| | | | |
|---|---|---|---|
| 2009/0034284 A1 | 2/2009 | Li et al. | |
| 2010/0254115 A1* | 10/2010 | Wegh | F21S 10/02 362/84 |
| 2010/0328632 A1 | 12/2010 | Kurosaki et al. | |
| 2011/0013389 A1* | 1/2011 | Willemsen | F21S 8/04 362/231 |

* cited by examiner

LIGHTING APPARATUS WITH LUMINOPHORE ON A MOVEABLE CARRIER

RELATED APPLICATIONS

This is a U.S. National stage of International application No. PCT/EP2012/068552 filed on Sep. 20 2012.

This patent application claims the priority of German application no. 10 2011 087 112.8 filed Nov. 25, 2011, the disclosure content of which is hereby incorporated by reference.

FIELD OF THE INVENTION

The invention relates to a lighting apparatus, comprising a light generating device for generating a primary light, a first luminophore for the wavelength conversion of the primary light into a first secondary light, and a second luminophore for the wavelength conversion of the primary light into a second secondary light, wherein the luminophore is situated on a movable carrier, which is designed to alternately introduce and remove the luminophore into and from a beam path of the primary light. The invention furthermore relates to a method for generating a wavelength-converted secondary light from primary light generated by means of a light generating device. The invention is applicable in particular as a projection apparatus, in particular for film and video projection, in technical and medical endoscopy, for lighting effects in the entertainment industry, for medical irradiations and also in the automotive sector, in particular as a headlight for motor vehicles.

BACKGROUND OF THE INVENTION

By means of known lighting apparatuses in which the luminophores are applied on a luminophore wheel as the movable carrier, different luminophores can be irradiated alternately by the primary light, and consequently, secondary light of different colors can be generated alternately. A light emitted from the lighting apparatus is consequentially a sequential succession of the different secondary light and, if appropriate, the primary light, which are perceived as a mixed light given a sufficiently rapid succession. Application on the luminophore wheel has the disadvantage that heat dissipation from the luminophore heated by the irradiation with the primary light is not effective and as a result, firstly, a light power is restricted and, secondly, there is the risk of degradation of the luminophore.

Lighting apparatuses are also known in which luminophore is applied on a non-movable or stationary heat sink as carrier. This enables effective heat dissipation from the luminophore, but disadvantageously necessitates a complex optical construction if more than one secondary light is intended to be generated.

SUMMARY OF THE INVENTION

One object of the present invention is at least partly to overcome the disadvantages of the prior art and, in particular, to provide a lighting apparatus by means of which sequentially generated mixed light can be generated in conjunction with a simple construction and effective cooling.

This and other objects are attained in accordance with one aspect of the present invention directed to a lighting apparatus, at least comprising a light generating device for generating a primary light; a first luminophore for the wavelength conversion of the primary light into a first secondary light; and a second luminophore for the wavelength conversion of the primary light into a second secondary light; wherein the first luminophore is situated on a movable carrier, which is designed to alternately introduce and remove the first luminophore into and from a beam path of the primary light, and the second luminophore is situated on a stationary carrier.

The primary light, the first secondary light and the second secondary light in each case have, in particular, a mutually different associated spectral composition and may each have, in particular, a mutually different associated peak wavelength.

The wavelength conversion of the primary light into the first secondary light and/or into the second secondary light by means of the first luminophore and/or the second luminophore, respectively, can take place in each case wholly or partly. A substantially complete conversion is particularly preferred.

The conversion preferably takes place from a shorter wavelength to a longer wavelength ("down conversion"), since this does not require additional energy. In this case, the wavelength of the primary light is therefore shorter than the wavelengths of the secondary light.

A luminophore can be understood to mean in particular any, in particular solid, substance which enables the wavelength conversion. The wavelength conversion may be based on fluorescence or phosphorescence, for example.

This lighting apparatus has the advantage that it can combine the advantages of a first luminophore situated on a movable carrier (namely provision of light of different colors achievable with a comparatively simple construction) with the advantage of a second luminophore situated on a stationary carrier (namely simple coolability). This makes use of the fact that heating of the luminophores (here of the first luminophore and of the second luminophore) is all the greater, the greater the Stokes shift, that is to say the greater the extent to which the excitation wavelength of the primary light differs from the excitation wavelength of the secondary light. An additional factor is different material properties such as a different thermal stability. In other words, while the first luminophore, in particular, can perform a suitable wavelength conversion with long-term stability even on a luminophore wheel having relatively poor heat dissipation, the second luminophore, in particular, may at the same time be cooled to a greater extent by the stationary carrier. The stationary carrier is a heat sink, in particular. In particular if the lighting apparatus comprises only exactly one stationary carrier, a particularly simple construction is possible.

In the case of such a lighting apparatus, the primary light, the first secondary light and the second secondary light are output as mixed light, in particular. In particular, these light components can be generated sequentially and their beam paths or light paths can be combined. If the temporal succession of the light components takes place faster than the temporal resolving power of the human eye, the sequential luminous flux is perceived as a mixed light having portions composed of the light components. The mixed light here can be composed, in particular, of portions of the first secondary light and of the second secondary light. Depending on the configuration, the mixed light can also have portions of the primary light.

Moreover, the lighting apparatus is not restricted to the use of only two luminophores. Consequently, "a first luminophore" should be understood to mean, in particular, "at least one first luminophore" (that is to say can also encompass a plurality of first, different luminophores). Moreover, "a second luminophore" can be understood to mean, in particular, "at least one second luminophore" (that is to say can also encompass a plurality of second, different luminophores).

Moreover, more than one movable carrier and more than one stationary carrier may be used. However, the use of exactly one movable carrier and exactly one stationary carrier is preferred since a particularly simple construction is thus made possible.

In one configuration, the movable carrier is a rotatable luminophore wheel having a plurality of segments passing through into the beam path of the primary light, at least one segment ("luminophore segment") comprises the first luminophore, at least one segment ("transmitted-light segment") is a segment that is transmissive at least for the primary light and the second secondary light, at least one segment ("reflector segment") is a segment that reflects at least the primary light, primary light emitted by the light generating unit can be radiated through the transmitted-light segment onto the second luminophore and first secondary light emitted by the second luminophore can be radiated back through the transmitted-light segment.

The luminophore segment can comprise a luminophore layer, in particular. By means of a thickness of the luminophore layer and/or the concentration of the luminophore in the luminophore layer, it is possible to set a degree of conversion, in particular of more than 98%. In order to achieve a particularly high luminous efficiency, the luminophore segment can be configured as reflective at the base of the luminophore layer.

The transmitted-light segment can be, for example, a simple through opening or hole in the luminophore wheel, or may have a light-transmissive window element.

By means of such a luminophore wheel, therefore, sequentially (i) the primary light can be converted into the first secondary light and in particular be radiated back, (ii) the primary light and the second secondary light can be transmitted practically simultaneously and (iii) the primary light can be reflected. A sequential light generation is thus generated from the primary light and the secondary light components.

In another configuration, the lighting apparatus comprises a first color-selective reflection element, which is arranged between the light generating unit and the luminophore wheel and which is configured as transmissive for the primary light emitted by the light generating unit and is configured as reflective for the primary light reflected by the luminophore wheel, the first secondary light and/or the second secondary light. This configuration has the advantage that the primary light can easily be fed in through the color-selective reflection element, and at least one of the light components that produce the mixed light can be forwarded likewise easily. A particularly compact lighting apparatus is provided as a result.

In a further configuration, the first color-selective reflection element is configured as reflective for the primary light reflected by the luminophore wheel, for the first secondary light and for the second secondary light, and the lighting apparatus is designed: in the case of a luminophore segment introduced into the beam path of the primary light, to reflect light emitted by said segment at the first color-selective reflection element; in the case of a reflector segment introduced into the beam path of the primary light, to reflect the primary light radiated onto the reflector segment back onto the color-selective reflection element; and in the case of a transmitted-light segment introduced into the beam path of the primary light, to radiate the light emitted by the second luminophore through the transmitted-light segment onto the color-selective reflection element. This configuration has the advantage that a sequential mixed-light beam output from the lighting apparatus can be generated with few optical elements and thus particularly inexpensively and compactly.

In this configuration, therefore, when a luminophore segment is situated in the beam path, in particular the primary light radiated through the first color-selective reflection element is directed onto the first luminophore and at least partly converted there into the first secondary light. The (at least partly wavelength-converted) light emitted by said luminophore segment passes onto the first color-selective reflection element and is reflected from there for coupling out. When a reflector segment is situated in the beam path, in particular the primary light radiated through the first color-selective reflection element is reflected back at the reflector segment onto the first color-selective reflection element and is reflected again from there for coupling out. The first color-selective reflection element is therefore transmissive for primary light under specific boundary conditions and reflective for primary light under other boundary conditions, e.g. depending on a polarization state of the primary light.

When a transmitted-light segment is situated in the beam path, in particular the primary light is radiated through it onto the second luminophore and at least partly converted there into the second secondary light. The (at least partly wavelength-converted) light emitted by this luminophore segment is radiated through the transmitted-light segment back onto the first color-selective reflection element and is reflected from there for coupling out.

During a rotation of the luminophore wheel, therefore, primary light, first secondary light (if appropriate with a residual light portion of primary light) and second secondary light (if appropriate with a residual light portion of primary light) is sequentially coupled out from the lighting apparatus, in particular as mixed light.

In one configuration, moreover, the first color-selective reflection element is configured as reflective at least for the first secondary light, and the lighting apparatus comprises a second color-selective reflection element, which is arranged between the luminophore wheel and the second luminophore and which is configured as transmissive for the primary light radiated through the transmitted-light segment and is configured as reflective for second secondary light emitted by the second luminophore, and the lighting apparatus is designed: in the case of a luminophore segment introduced into the beam path of the primary light, to reflect light emitted by said segment at the color-selective reflection element; in the case of a reflector segment introduced into the beam path of the primary light, to reflect the primary light radiated onto the reflector segment back onto the color-selective reflection element; and in the case of a transmitted-light segment introduced into the beam path of the primary light, to radiate the primary light transmitted by said transmitted-light segment through the second color-selective reflection element onto the second luminophore and to reflect second secondary light emitted by the second luminophore by means of the second color-selective reflection element. This configuration enables a separate coupling-out of the light emitted by the second luminophore, said coupling-out not being directed via the first color-selective reflection element.

The first color-selective reflection element may be light-transmissive in particular only for one of the light components (primary light, first and second secondary light). The first color-selective reflection element may be a dichroic mirror, in particular.

In one development which is particularly preferred for a compact light guidance and design, the first color-selective reflection element is variably (that is to say depending on at least one adjustable parameter) light-transmissive. Said parameter can be, in particular, a polarization or a degree of polarization. By way of example, the first color-selective reflection element may be transmissive for a primary light emitted by the light generating unit since said primary light has a polarization or direction of polarization suitable for transmission. At least the reflected primary light may have a polarization or direction of polarization unsuitable for transmission and is consequently reflected.

In one configuration, moreover, the first color-selective reflection element has a polarization-dependent transmittance for the primary light, and an optical element which acts on the primary light and changes a polarization is arranged between the color-selective reflection element and the luminophore wheel. By means of the polarization-changing optical element, it is possible to set the polarization of the primary light downstream of the first color-selective reflection element in a targeted manner such that it is reflected upon renewed impingement. The polarization-changing optical element can be, in particular, a wave plate, in particular a quarter-wave plate or lambda/4 plate. Alternatively or supplementarily, other polarization-changing devices known to a person skilled in the art can also be used, for example a Faraday rotator or a Kerr cell.

In one configuration, furthermore, the first color-selective reflection element is configured as reflective at least for the second secondary light, and the lighting apparatus comprises a further color-selective reflection element, which is arranged downstream of the luminophore wheel in a beam path of the primary light and of the first secondary light and downstream of the first color-selective reflection element in a beam path of the second secondary light and which is configured as reflective for the primary light and the first secondary light and is configured as transmissive for the second secondary light, and the luminophore wheel is arranged obliquely in the beam path of the primary light, and the lighting apparatus is designed: in the case of a luminophore segment introduced into the beam path of the primary light, to radiate light emitted by said luminophore segment onto the further color-selective reflection element; in the case of a reflector segment introduced into the beam path of the primary light, to radiate the primary light reflected by the reflector segment onto the further color-selective reflection element; and in the case of a transmitted-light segment introduced into the beam path of the primary light, to radiate the light emitted by the second luminophore through the transmitted-light segment onto the first color-selective reflection element and to reflect it there onto the further color-selective reflection element. In the case of this configuration, by means of a simple inclination of the luminophore wheel, it is possible to achieve a separate coupling-out of the light emitted by the luminophore wheel (primary light and first secondary light), said coupling-out not being directed via the first color-selective reflection element. A wave plate can thus be dispensed with.

The light generating unit can comprise at least one light source. It is particularly preferred for the light generating device to comprise at least one laser light source. A laser light source has the advantage that it can generate a narrow band spectrum with high intensity. However, by way of example, combinations of wide-emission light sources and downstream spectral filters can also be used.

Preferably, the at least one light source comprises at least one semiconductor light source, since such a semiconductor light source can be provided in a compact fashion and inexpensively. The at least one semiconductor light source can comprise, in particular, at least one laser diode or at least one light-emitting diode, but is not restricted thereto. However, the light sources are not restricted thereto, but rather can comprise, in particular, all types of laser beam sources, in particular with polarized radiation.

Light can generally be understood to mean UV light, visible light and/or IR light.

In one configuration, furthermore, the primary light is blue light, in particular having a peak wavelength of approximately 445 nm, one secondary light is green light and another secondary light is red light. In particular, blue light can be converted into red and green light without further energy input. These three light components, as mixed light, can span a large-area color space, in particular, and generate white mixed light, in particular.

In one development, the first secondary light is red light and the second secondary light is green light. Alternatively, the second secondary light may be red light and the first secondary light may be green light.

However, the lighting apparatus is not restricted to such a choice of colors. By way of example, additionally or alternatively, secondary light of a different color may be used instead of red and/or green secondary light.

Moreover, ultraviolet light (UV light) may be used as primary light. In particular in this case as well, a further luminophore segment on the luminophore wheel may be used instead of the reflector segment. The UV light may then be converted into visible secondary light for example by a first and third luminophore on the luminophore wheel and by the second luminophore on the stationary carrier. By way of example, the first luminophore may convert UV light into green or red light, the second luminophore may convert UV light into red or green light, and the third luminophore may convert UV light into blue light.

However, instead of the UV light, short-wave blue light may also be used, e.g. having a peak wavelength of approximately 445 nm, and may be converted into longer-wave blue light, e.g. having a peak wavelength of approximately 460 nm, by the third luminophore.

Very generally, the reflector segment may also be dispensed with and only light emitted by the luminophore(s), i.e. secondary light if appropriate with a primary light component, may be used.

The lighting apparatus may, in particular, additionally comprise optical elements for beam shaping such as at least one lens, in particular converging lens, diaphragm.

The lighting apparatus may comprise, in particular, at least one beam combiner for combining the primary light and secondary light (in any combination). In particular a color-selective mirror, in particular dichroic mirror, may be used as the beam combiner.

Another aspect of the present invention is directed to a method for generating wavelength-converted secondary light from primary light generated by a light generating device, wherein the, method comprises alternately irradiating a first luminophore situated on a movable carrier and a second luminophore situated on a stationary carrier by means of the primary light. The method has the same advantages as the lighting apparatus and may be configured analogously.

BRIEF DESCRIPTION OF THE DRAWINGS

The above-described properties, features and advantages of this invention and also the way in which they are achieved will become clearer and more clearly understood in association with the following schematic description of exemplary embodiments that are explained in greater detail in association with the drawings. In this case, identical or identically acting elements may be provided with identical reference signs, for the sake of clarity.

DETAILED DESCRIPTION OF THE DRAWINGS

Figure 1:
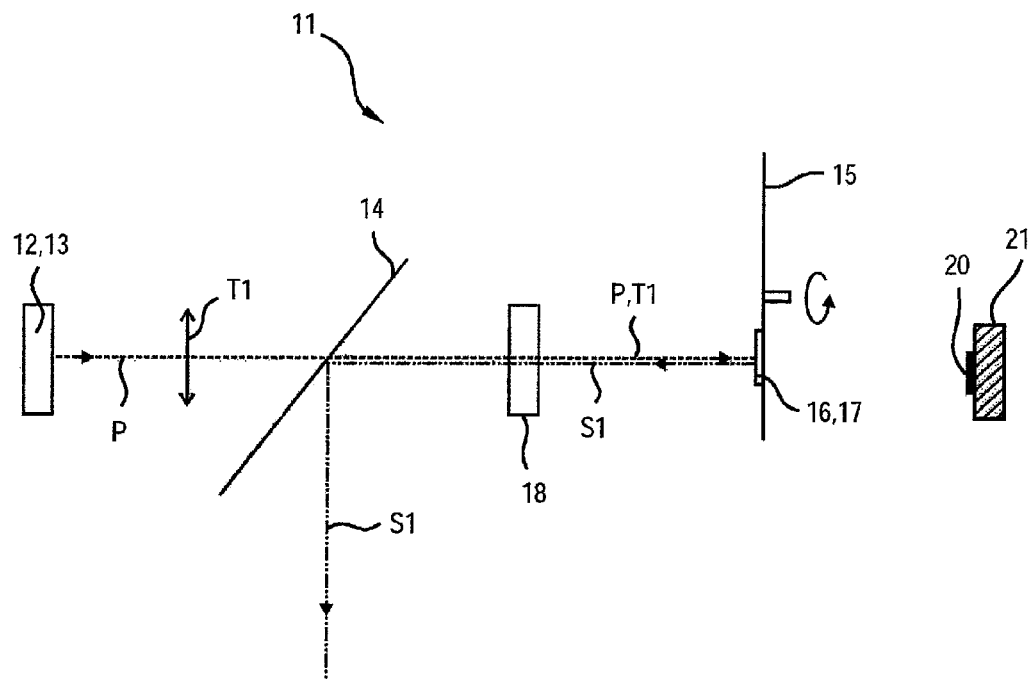
FIG. 1 shows in side view a schematic diagram of a first lighting apparatus according to an embodiment of the invention with a luminophore wheel in a first rotational position.

FIG. 1 shows a first lighting apparatus 11 according to the invention. The lighting apparatus 11 comprises a light generating device 12 having at least one laser diode 13 which generates blue primary light P having a peak wavelength of approximately 445 nm. After emerging from the light generating device 12, the primary light P has a transverse polarization T1 in a perpendicular direction (i.e. in the plane of the illustration).

A first color-selective reflection element in the form of a first dichroic mirror 14 having a polarization-dependent transmittance is disposed downstream of the light generating device 12. The dichroic mirror 14 is transmissive for the blue primary light P having the transverse polarization T1 generated by the light generating device 12.

A rotatable luminophore wheel 15 used as a movable carrier is arranged proceeding from the light generating device 12 optically downstream of the dichroic mirror 14. The luminophore wheel 15 has a plurality of segments in a manner known in principle, which segments can alternately pass through the beam path of the primary light P as a result of the rotation of the luminophore wheel 15. In this figure, a luminophore segment 17 coated with a luminophore layer of a first luminophore 16 is situated in the beam path of the primary light P. By means of the first luminophore 16, the primary light P here is converted substantially completely into first (e.g. green or red) secondary light S1 and radiated back onto the dichroic mirror 14. For this purpose, a converging lens (not illustrated) may be disposed upstream of the luminophore wheel 15.

A polarization-changing optical transmitted-light element in the form of a quarter-wave plate 18, arranged in the beam path between the dichroic mirror 14 and the luminophore wheel 15, has no practical effect on the generation and beam shaping of the first secondary light S1.

Since the dichroic mirror 14 is embodied as specularly reflective, rather than transmissive, for the first secondary light S1, the first secondary light S1 is reflected at said mirror and emitted for coupling out from the lighting apparatus 11.

Figure 2:
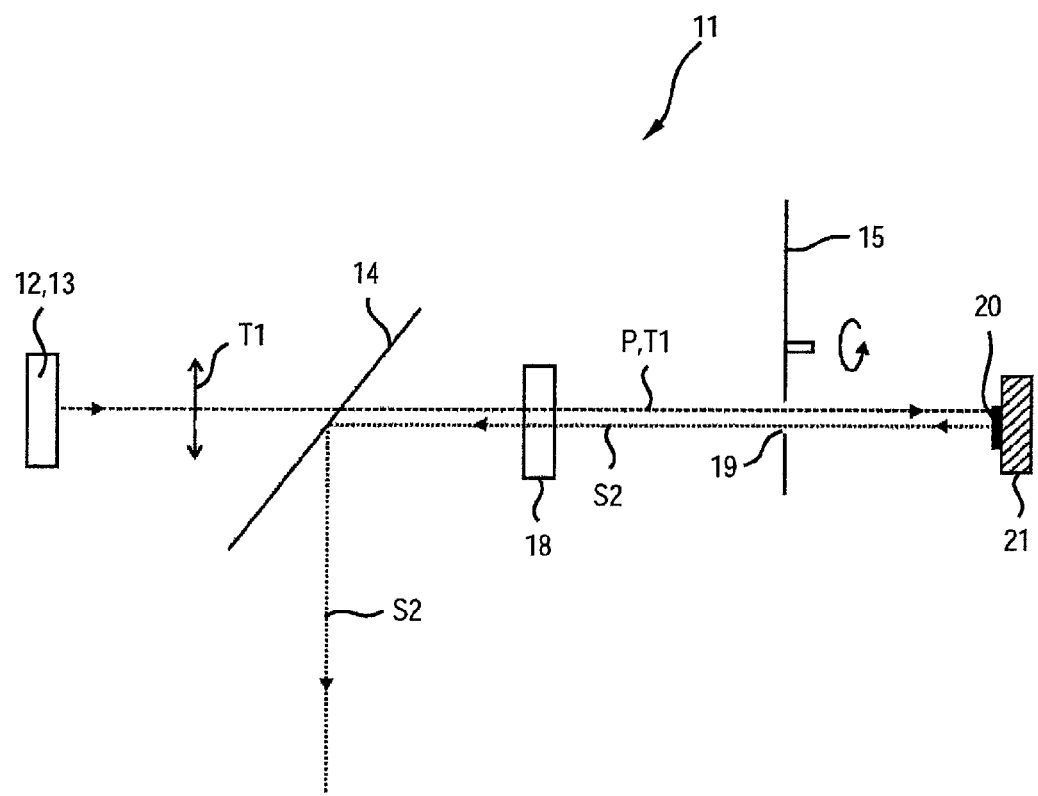
FIG. 2 shows the first lighting apparatus according to an embodiment of the invention with the luminophore wheel in a second rotational position.

During a further rotation of the luminophore wheel 15, the luminophore segment 17 is rotated out of the beam path and a transmitted-light segment 19 is rotated into the beam path, which position is shown in FIG. 2. The transmitted-light segment 19 may be configured, for example, as a hole in the luminophore wheel 15. The transmitted-light segment 19 is therefore transmissive for all light.

Primary light P impinging on the transmitted-light segment 19 passes through and impinges on the second luminophore 20. The second luminophore 20 is applied as a luminophore layer on a stationary heat sink 21. By means of the second luminophore 20, the primary light P here is converted substantially completely into second (e.g. red or green) secondary light S2 and radiated back through the transmitted-light segment 19 onto the dichroic mirror 14. For this purpose, a converging lens (not illustrated) may be disposed upstream of the luminophore 20. The quarter-wave plate 18 also has no practical effect on the generation and beam shaping of the second secondary light S2. Since the first dichroic mirror 14 is embodied as secularly reflective for the second secondary light S2, too, the second secondary light S2 is also reflected at said mirror and emitted for coupling out from the lighting apparatus 11.

Figure 3:
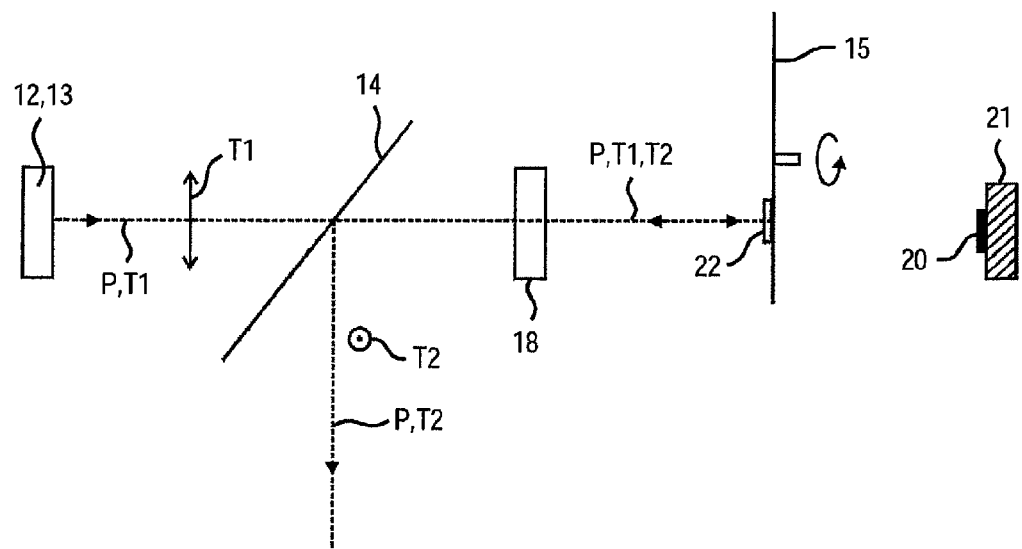
FIG. 3 shows the first lighting apparatus according to an embodiment of the invention with the luminophore wheel in a third rotational position.

During a further rotation of the luminophore wheel 15, the transmitted-light segment 19 is rotated out of the beam path and a reflector segment 22 is rotated into the beam path, which position is shown in FIG. 3. The reflector segment 22 has a reflectively coated surface and is consequently reflective for the primary light P, in particular.

During a first passage of the primary light P through the quarter-wave plate 18 in the direction of the reflector segment 22, the original polarization of the primary light P is changed from the transverse polarization T1 into a circular polarization. After reflection at the reflector segment 22, the direction of rotation of the circularly polarized light changes. During a following renewed passage through the quarter-wave plate 18 (in the opposite direction toward the dichroic mirror 14), the circularly polarized primary light becomes a transversely polarized light again. However, a resultant transverse polarization direction T2 is perpendicular to the original polarization direction T1 (perpendicular to the plane of the illustration). The dichroic mirror 14 has a polarization-dependent transmittance in such a way that it is reflective for the blue primary light P having the transverse polarization T2. Consequently, the primary light having the polarization direction T2 is also reflected at said mirror and emitted for coupling out from the lighting apparatus 11.

Figure 4:
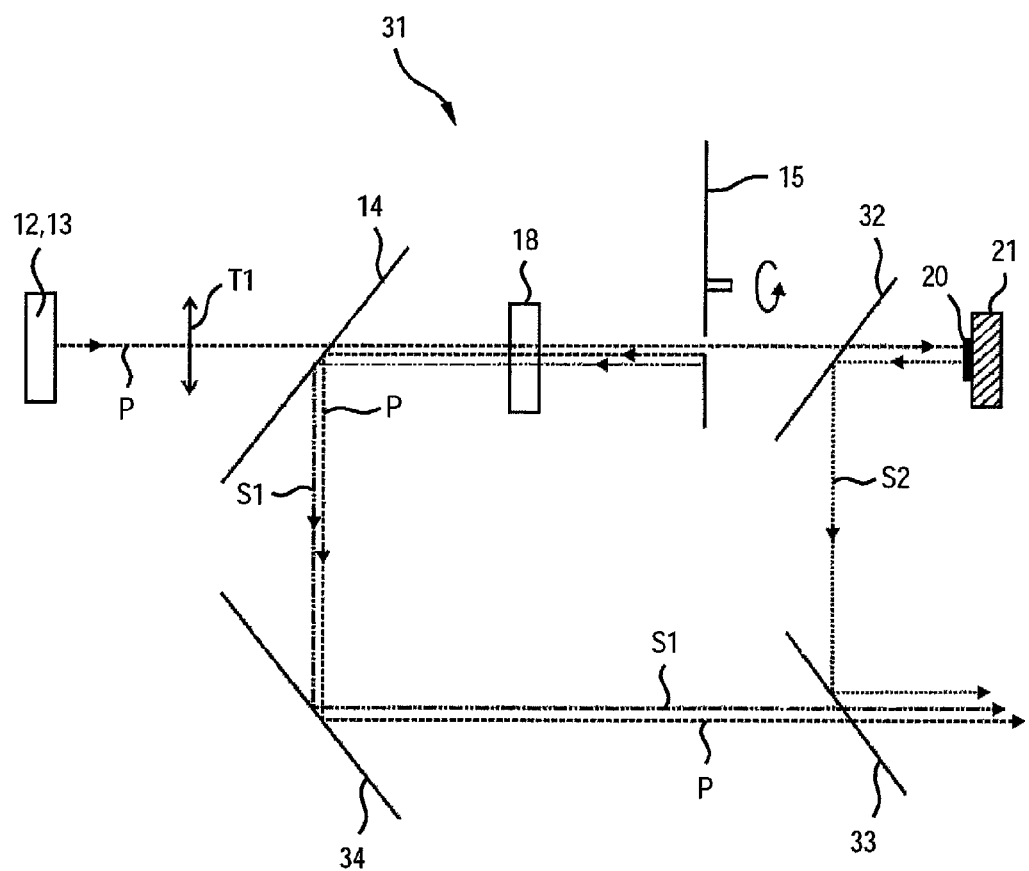
FIG. 4 shows in side view a schematic diagram of a second lighting apparatus according to an embodiment of the invention with positions of the luminophore wheel combined in one illustration.

FIG. 4 shows a second lighting apparatus 31 according to the invention with positions of the luminophore wheel 15 combined in one illustration.

The lighting apparatus 31 differs from the lighting apparatus 11 in that the second secondary light S2 emitted by the second luminophore 20 is not radiated through the transmitted-light segment 19, but rather guided past the latter. For this purpose, a second dichroic mirror 32 is arranged in the beam path of the primary light P between the luminophore wheel 15 and the second luminophore 20, said second dichroic mirror being transmissive for the primary light P and reflective for the second secondary light S2. Said second dichroic mirror 32 reflects the second secondary light S2 onto a third dichroic mirror 33.

The third dichroic mirror 33 is configured as transmissive for the primary light P and the first secondary light S1 and as reflective for the second secondary light S2. The third dichroic mirror 33 is irradiated at the rear with the primary light P and first secondary light S1 reflected by the (first) dichroic mirror 14 (via a non-color-selective mirror 34), while the second primary light S2 is incident on the front side. Therefore, all the light components P, S1, S2 are coupled out from the lighting apparatus 31 in the same direction. Consequently, the third dichroic mirror 33 also serves as a beam combiner.

The lighting apparatus 31 has the advantage, inter alia, that a requirement made of the first dichroic mirror 14 is less stringent, on account of the second secondary light S2 no longer needing to be taken into account there, and said mirror can consequently be chosen to be simpler and less expensive.

Figure 5:
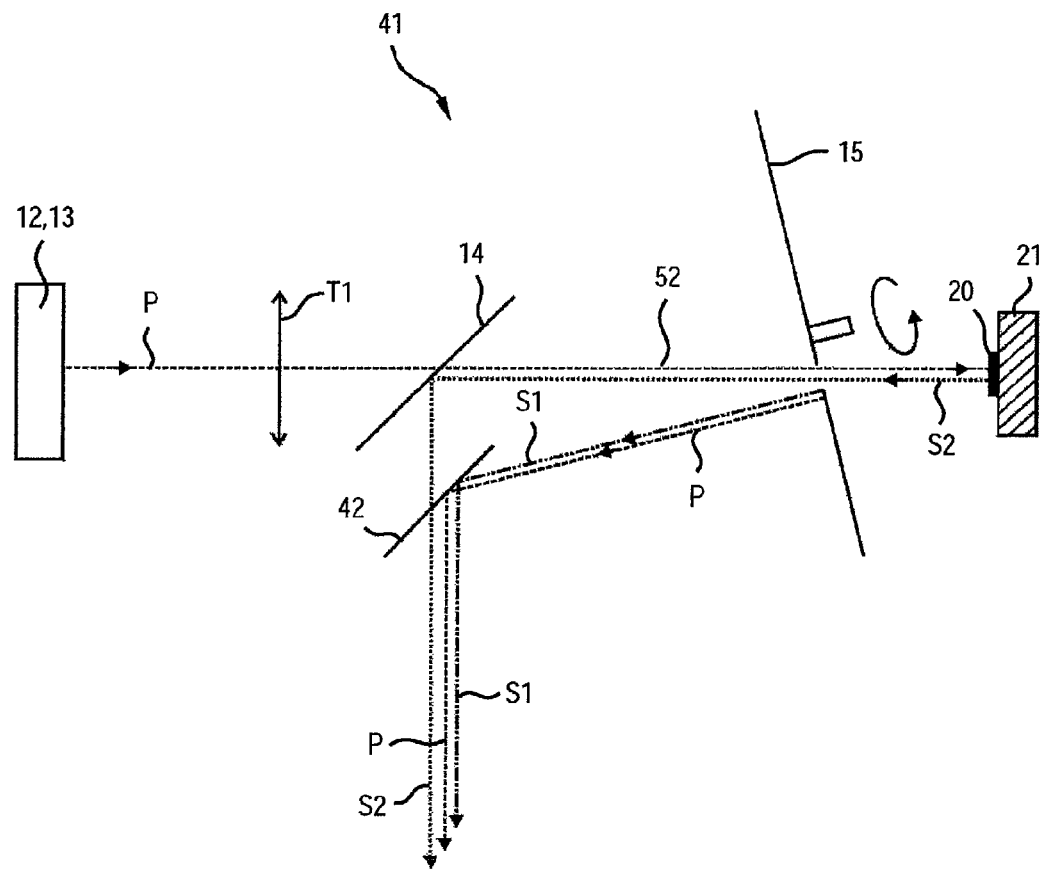
FIG. 5 shows in side view a schematic diagram of a third lighting apparatus according to an embodiment of the invention with positions of the luminophore wheel combined in one illustration.

FIG. 5 shows a third lighting apparatus 41 according to the invention with positions of the luminophore wheel 15 combined in one illustration. The luminophore wheel 15 is there inclined, such that the primary light P reflected at said wheel and the first secondary light S1 are not radiated onto the first dichroic mirror 14, but rather onto a fourth dichroic mirror 42. The fourth dichroic mirror 42 is configured as reflective for the primary light P and for the first secondary light S1 and is configured as transmissive for the second secondary light S2. The fourth dichroic mirror 42 is irradiated at the rear with the second secondary light S2, while the primary light P and the first secondary light S1 are incident on the front side. Consequently, all the light components P, S1, S2 are coupled out from the lighting apparatus 41 sequentially in the same direction. Consequently, the fourth dichroic mirror 42 also serves as a beam combiner. In the case of the lighting apparatus 41, in particular a wave plate for the primary light P can be dispensed with.

The lighting apparatus 41 has the advantage, inter alia, that a requirement made of the first dichroic mirror 14 is less stringent, on account of the primary light P no longer needing to be taken into account there, and said mirror can consequently be chosen to be simpler and less expensive, in particular no longer need be configured in a polarization-dependent manner. Moreover, the quarter-wave plate 18 can be dispensed with, which increases a luminous efficiency.

Although the invention has been more specifically illustrated and described in detail by means of the exemplary embodiments shown, the invention is nevertheless not restricted thereto, and other variations can be derived therefrom by a person skilled in the art, without departing from the scope of protection of the invention.

In this regard, the light generating device can comprise a plurality of light sources, in particular semiconductor light sources, in particular laser diodes, which have identical and/or different emission wavelengths.

The invention claimed is:

1. A lighting apparatus, comprising:
a light generating device for generating a primary light;
a first luminophore for the wavelength conversion of the primary light into a first secondary light; and
a second luminophore for the wavelength conversion of the primary light into a second secondary light;
and wherein:
the first luminophore is situated on a movable carrier, which is configured to alternately introduce and remove the first luminophore into and from a beam path of the primary light,
the second luminophore is situated on a stationary carrier,
the movable carrier is a rotatable luminophore wheel having a plurality of segments passing through into the beam path of the primary light,
at least one luminophore segment comprises the first luminophore,
at least one transmitted-light segment is a segment that is transmissive at least for the primary light and the second secondary light,
at least one reflector segment is a segment that reflects at least the primary light,
primary light emitted by the light generating unit can be radiated through the transmitted-light segment onto the second luminophore, and
second secondary light emitted by the second luminophore can be radiated back through the transmitted-light segment.

2. The lighting apparatus as claimed in claim 1, wherein the lighting apparatus comprises a first color-selective reflection element, which is arranged between the light generating unit and the luminophore wheel and which is configured as transmissive for the primary light emitted by the light genera ting unit and is configured as reflective for the primary light, the first secondary light and/or the second secondary light.

3. The lighting apparatus as claimed in claim 2,
wherein the first color-selective reflection element is configured as reflective for the primary light reflected by the luminophore wheel, for the first secondary light and for the second secondary light, and
wherein the lighting apparatus is configured:
in the case of a luminophore segment introduced into the beam path of the primary light, to reflect light emitted by said segment at the first color-selective reflection element;
in the case of a reflector segment introduced into the beam path of the primary light, to reflect the primary light radiated onto the reflector segment back onto the color-selective reflection element; and
in the case of a transmitted-light segment introduced into the beam path of the primary light, to radiate the light emitted by the second luminophore through the transmitted-light segment onto the color-selective reflection element.

4. The lighting apparatus as claimed in claim 3,
wherein the first color-selective reflection element has a polarization-dependent transmittance for the primary light, and
wherein an optical element acts on the primary light and changes a polarization is arranged between the color-selective reflection element and the luminophore wheel.

5. The lighting apparatus as claimed in claim 2,
wherein the first color-selective reflection element is configured as reflective at least for the first secondary light,
wherein the lighting apparatus comprises a second color-selective reflection element, which is arranged between the luminophore wheel and the second luminophore and which is configured as transmissive for the primary light radiated through the transmitted-light segment and is configured as reflective for second secondary light emitted by the second luminophore, and
wherein the lighting apparatus is configured:
in the case of a luminophore segment introduced into the beam path of the primary light, to reflect light emitted by said segment at the first color-selective reflection element;
in the case of a reflector segment introduced into the beam path of the primary light, to reflect the primary light radiated onto the reflector segment back onto the first color-selective reflection element; and in the case of a transmitted-light segment introduced into the beam path of the primary light, to radiate the primary light transmitted by said segment through the second color-selective reflection element onto the second luminophore and to reflect second secondary light emitted by the second luminophore by means of the second color-selective reflection element.

6. The lighting apparatus as claimed in claim 5, wherein the first color-selective reflection element has a polarization-dependent transmittance for the primary light, and wherein an optical element acts on the primary light and changes a polarization is arranged between the color-selective reflection element and the luminophore wheel.

7. The lighting apparatus as claimed in claim 6, wherein said optical element is a quarter-wave plate.

8. The lighting apparatus as claimed in claim 2, wherein the first color-selective reflection element is configured as reflective at least for the second secondary light wherein the lighting apparatus comprises a further color-selective reflection element, which is arranged downstream of the luminophore wheel in a beam path of the reflected primary light and of the first secondary light and downstream of the first color-selective reflection element in a beam path of the second secondary light and which is configured as reflective for the primary light and the first secondary light and is configured as transmissive for the second secondary light, wherein the luminophore wheel is arranged obliquely in the beam path of the primary light, and wherein the lighting apparatus is configured:

in the case of a luminophore segment introduced into the beam path of the primary light, to radiate light emitted by said luminophore segment onto the further color-selective reflection element;

in the case of a reflector segment introduced into the beam path of the primary light, to radiate the primary light reflected by the reflector segment onto the further color-selective reflection element; and in the case of a transmitted-light segment introduced into the beam path of the primary light, to radiate the light emitted by the second luminophore through the transmitted-light segment onto the first color-selective reflection element and to reflect it there onto the further color-selective reflection element.

9. The lighting apparatus as claimed in claim 1, wherein the light generating device comprises at least one laser light source.

10. The lighting apparatus as claimed in claim 1, wherein:

the primary light is blue light and one secondary light is green light and another secondary light is red light.

11. The lighting apparatus as claimed in claim 1, wherein:

the primary light has a peak wavelength of approximately 445 nm, and one secondary light is green light and another secondary light is red light.

* * * * *